Patented Nov. 1, 1932

1,886,001

UNITED STATES PATENT OFFICE

ALFRED FEHRLE, OF BAD-SODEN ON TAUNUS, GERMANY, ASSIGNOR TO WINTHROP CHEMICAL COMPANY, INC., OF NEW YORK, N. Y., A CORPORATION OF NEW YORK

READILY SOLUBLE SALTS OF ACRIDINE BASES SUBSTITUTED IN 9-POSITION BY BASIC RESIDUES

No Drawing. Application filed August 9, 1929, Serial No. 384,808, and in Germany October 8, 1928

The present invention relates to readily soluble salts of acridine bases which are substituted in 9-position by basic residues, more particularly to the acetates of the aminoacridine compounds of the following probable general formula:

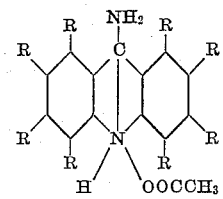

wherein one R represents hydrogen, alkyl or amino in which latter case one further R may be alkoxy, or hydrogen, the remaining R's being hydrogen.

The hitherto known salts of acridines substituted in 9-position by basic residues are generally relatively sparingly soluble in cold water. Therefore more readily soluble salts were desired for therapeutical use, especially in veterinary science.

Now I have found that the acetates of these acridine bases substituted in 9-position by basic residues possess a still greater solubility than the known lactates. This is very surprising, because, of the acids hitherto used for salt formation, lactic acid generally gives the salts which are most readily soluble. Thus, the silver lactate, the copper lactate and cadmium lactate dissolves considerably better in water than the corresponding acetates do.

The following examples serve to illustrate the invention, but they are not intended to limit it thereto.

(1) 126 g of 7-ethoxy-3.9-diaminoacridine are suspended in 500 ccm of water, 30 g of glacial acetic acid are added and the whole is heated. The solid acetate is obtained either by precipitating it from the cooled filtrate by acetone amounting to five times the volume of the filtrate or by allowing the crystals to separate on standing for a prolonged time. The salt is yellow and readily soluble in water. It has the following probable formula:

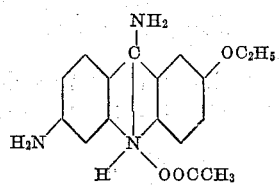

(2) 42 g of 3.9-diaminoacridine are dissolved in 170 ccm of water and 12 g of glacial acetic acid, while heating, and the yellow acetate is precipitated from the cooled filtrate by means of acetone. It is readily soluble in water and has the following probable formula:

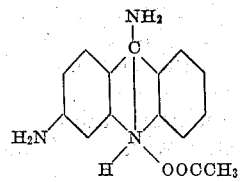

(3) 15 g of 9-aminoacridine nitrate are dissolved in 1500 ccm of hot water and the base is precipitated by means of caustic soda solution; then the whole is cooled, filtered by suction and the residue is washed with water. The base is then suspended in 90 ccm of water and 30 ccm of 2N-acetic acid are added. The whole is dissolved by gently heating and the solution is filtered into 1200 ccm. of acetone. After a short time the salt crystallizes. It is filtered by suction, washed with acetone and ether and dried. The yellow preparation is very readily soluble in water. It has the following probable formula:

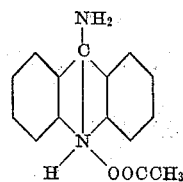

(4) 7 g of 7-methyl-9-aminoacridine sulfate are dissolved in 1400 ccm of hot water and the base is precipitated by means of caustic soda solution. The base which is precipitated as described in Example 3 is suspended in 42 ccm of water and dissolved by addition of 14 ccm of 2N acetic acid. The solution is filtered into 560 ccm of acetone and the acetate is precipitated by rubbing with a glass rod. Some ether is added and the whole is filtered by suction. The yellow salt thus obtained dissolves in water. It has the following probable formula:

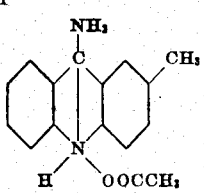

Of course also such 9-amino acridine bases as are substituted in the other positions than those indicated above by alkyl, O-alkyl or $NH_2$ can be caused to react with acetic acid so as to form readily soluble salts.

I claim:

1. As new products the aminocridine compounds of the following probable general formula:

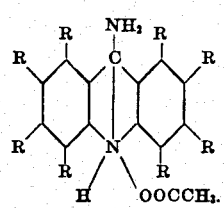

wherein one R represents hydrogen, alkyl or amino in which latter case one further R may be alkoxy or hydrogen, the remaining R's being hydrogen, said compounds forming yellow crystals readily soluble in water.

2. As new products the aminoacridine compounds of the following probable general formula:

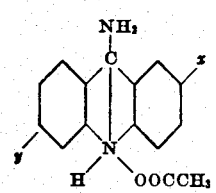

wherein y represents hydrogen or amino and x represents hydrogen, ethoxy or methyl in which latter case y stands for hydrogen only, forming yellow crystals readily soluble in water.

3. As a new product the 7-ethoxy-3.9-diaminoacridine acetate of the following probable formula:

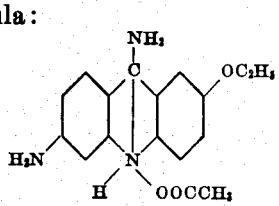

forming yellow crystals readily soluble in water.

4. As a new product the 7-methyl-9-aminoacridine acetate of the following probable formula:

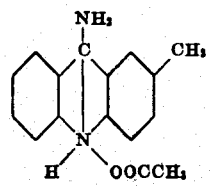

forming yellow crystals soluble in water.

5. As a new product the 3.9-diaminoacridine acetate of the following probable formula:

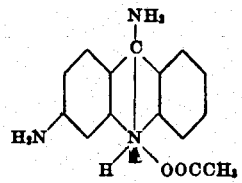

being readily soluble in water.

In testimony whereof, I affix my signature.

ALFRED FEHRLE.